(12) United States Patent
Bisceglia et al.

(10) Patent No.: US 8,098,681 B2
(45) Date of Patent: Jan. 17, 2012

(54) METHOD AND APPARATUS FOR DYNAMIC TERMINATION OF UNUSED WIRED CONNECTION

(75) Inventors: Brian Bisceglia, Worcester, MA (US); Michael W. Carrafiello, Hudson, NH (US)

(73) Assignee: Avaya Inc., Basking Ridge, NJ (US)

( * ) Notice: Subject to any disclaimer, the term of this patent is extended or adjusted under 35 U.S.C. 154(b) by 2820 days.

(21) Appl. No.: 10/352,932

(22) Filed: Jan. 29, 2003

(65) Prior Publication Data

US 2004/0146061 A1   Jul. 29, 2004

(51) Int. Cl.
*H04L 12/66* (2006.01)
(52) U.S. Cl. .................. 370/463; 370/318; 370/521
(58) Field of Classification Search .......... 370/112, 370/318, 463, 521; 700/286; 455/127.1
See application file for complete search history.

(56) References Cited

U.S. PATENT DOCUMENTS

| | | | | |
|---|---|---|---|---|
| 5,923,663 A * | 7/1999 | Bontemps et al. | ........... | 370/445 |
| 5,991,885 A * | 11/1999 | Chang et al. | .......... | 713/300 |
| 5,999,619 A * | 12/1999 | Bingel | .......... | 379/394 |
| 6,140,911 A * | 10/2000 | Fisher et al. | .......... | 375/258 |
| 6,218,930 B1 * | 4/2001 | Katzenberg et al. | .......... | 370/200 |
| 6,348,874 B1 * | 2/2002 | Cole et al. | .......... | 340/825.01 |
| 6,486,746 B1 * | 11/2002 | Gilbert | .......... | 333/22 R |
| 6,492,880 B1 * | 12/2002 | Chiappe et al. | .......... | 333/22 R |
| 6,535,983 B1 * | 3/2003 | McCormack et al. | .......... | 713/310 |
| 6,541,878 B1 * | 4/2003 | Diab | .......... | 307/17 |
| 6,571,181 B1 * | 5/2003 | Rakshani et al. | .......... | 702/60 |
| 6,643,566 B1 * | 11/2003 | Lehr et al. | .......... | 700/286 |
| 6,643,595 B2 * | 11/2003 | Rakshani et al. | .......... | 702/60 |
| 6,804,351 B1 * | 10/2004 | Karam | .......... | 379/413 |
| 6,832,104 B2 * | 12/2004 | Sakurai | .......... | 455/558 |
| 6,841,979 B2 * | 1/2005 | Berson et al. | .......... | 323/282 |
| 6,956,462 B2 * | 10/2005 | Jetzt | .......... | 379/413 |
| 6,986,071 B2 * | 1/2006 | Darshan et al. | .......... | 713/330 |
| 7,030,733 B2 * | 4/2006 | Abbarin | .......... | 340/310.11 |
| 7,046,983 B2 * | 5/2006 | Elkayam et al. | .......... | 455/402 |
| 7,162,650 B2 * | 1/2007 | Ke et al. | .......... | 713/300 |
| 7,480,233 B2 * | 1/2009 | Binder | .......... | 370/200 |
| 7,593,756 B2 * | 9/2009 | Ferentz et al. | .......... | 713/300 |
| 7,660,345 B2 * | 2/2010 | Yu | .......... | 375/222 |
| 2003/0072438 A1 * | 4/2003 | Le Creff et al. | .......... | 379/399.01 |
| 2003/0084356 A1 * | 5/2003 | Park | .......... | 713/300 |
| 2003/0087670 A1 * | 5/2003 | Muir | .......... | 455/557 |
| 2003/0146765 A1 * | 8/2003 | Darshan et al. | .......... | 324/539 |
| 2008/0267212 A1 * | 10/2008 | Crawley et al. | .......... | 370/463 |

OTHER PUBLICATIONS

IEEE; "Draft P802.af/D3.1 data Terminal Equipment (DTE) Power via Media Dependent Interface( MDI)"; 2002; IEEE; pp. 1-110.*
Darshan, Yair; "PSE based Disconnected-Detetion Altenative" 2002; PowerDsine; pp. 1-42.*

* cited by examiner

*Primary Examiner* — Ricky Ngo
*Assistant Examiner* — Dewanda Samuel
(74) *Attorney, Agent, or Firm* — Muncy, Geissler, Olds & Lowe, PLLC

(57) ABSTRACT

A system and method provide dynamic termination of the unused wired connections in a communications interface of a communications device. An interconnected controller, switch, and termination circuit are provided to connect at least one unused wired connection of the communications interface to ground in response to a pre-determined event. Dynamic termination of one or more unused wired connections of the communications interface can occur while still allowing power delivery, via the interface, to the communications device to maintain operation of the communications device.

22 Claims, 6 Drawing Sheets

Background Art

Communications Interface Designations

| Pin# | Label | Description |
|---|---|---|
| 1 | RX+ | Data Receive |
| 2 | RX− | Data Receive |
| 3 | TX+ | Data Transmit |
| 4 | −$V_{dc}$_return(+) | Feeding power (+) |
| 5 | −$V_{dc}$_return(+) | Feeding power (+) |
| 6 | TX− | Data Transmit |
| 7 | −$V_{dc}$(−) | Feeding power(−) |
| 8 | −$V_{dc}$(−) | Feeding power(−) |
| 9 | Shield | Connector shielding |

FIG. 3

Background Art

Input Section Requirements

| Parameter | Conditions | Min | Max | Unit |
|---|---|---|---|---|
| Detection Signature | | | | |
| V-I Slope | 2.7$V_{dc}$-10.1$V_{dc}$ | 23.75 | 26.25 | KΩ |
| Port Input Capacitance | During detection, 2.7$V_{dc}$-10.1$V_{dc}$ | 0.05 | 0.1 | μF |
| Port Input Inductance | During detection, 2.7$V_{dc}$-10.1$V_{dc}$ | | 100 | μHY |
| Offset Current | During detection, 2.7$V_{dc}$-10.1$V_{dc}$ | | 10 | μA |
| Offset Voltage | | | 1.9 | V |
| Start-Up | | | | |
| Start-up Time | Time from voltage applied til current exceeds 10mA | | 300 | mSec |
| Normal Operation | | | | |
| Power Consumption | | | 12.95 | W |
| Operating Input Voltage Range | | 36 | 57 | V |
| Must turn on voltage | | 30 | | V |
| Must turn off voltage | | 10 | 44 | V |
| Input Current | Maximum current at 36V | | 350 | mA |
| Input Current, Peak | Maximum duration of 50mSec, with maximum 5% duty cycle | | 400 | mA |
| Inrush current, $C_{port}$>180μF | For a maximum of 50mSec | | 400 | mA |
| Inrush current, $C_{port}$>180μF | Limited by the Power Supply Equipment (PSE) | | | |
| Port Capacitance | Without any current limit on the | | | |

400

METHOD AND APPARATUS FOR DYNAMIC TERMINATION OF UNUSED WIRED CONNECTION

TECHNICAL FIELD

The present invention relates generally to communication services. It particularly relates to a method and system for providing dynamic termination capability for an unused wired connection in a communications interface.

BACKGROUND OF THE INVENTION

Communications systems (e.g., public switched telephone system, cable television, LANs—local area networks, etc.) have been rampantly deployed in the marketplace for a number of years to provide high-speed, broadband communications services. A significant factor in providing quality communications services is the reduction and/or elimination of interference (e.g., electromagnetic interference—EMI, spurious radiation/emissions, noise) in the communications medium that attenuates the received signal-to-noise ratio at the receiving end. To ensure this goal, a plurality of different communications media have been developed to help reduce the unwanted interference (e.g., coax, shielded twisted pair, optical fiber).

However, new communications services that allow power along with data to be delivered, via the communications medium, to a receiving communications device require even more stringent interference reduction measures to be taken. One exemplary power/data communications standard is the Power over LAN standard in accordance with the IEEE 802.3af Draft 3.0 February 2002 specification hereby incorporated by reference. This standard has been recently developed for LANs (e.g., Ethernet) allowing the service provider to deliver power and data over the communications medium (e.g., category 5—CAT 5 cable) to the receiving communications device via an input port (e.g., 8-pin RJ-45 port).

Although the standard does specify techniques to isolate the LAN power feed from the rest of the circuitry in the receiving communications device (DTE—data terminal equipment or PD—powered device), there is no mention of reducing and/or eliminating the spurious emissions potentially caused by the unused pins within the input port since only four of the eight pins may be used for power delivery and data communications (e.g., pins 1-3, 6). During power delivery from and data communications service with the provider, coupling (from spurious emissions) may occur from the LAN cable on to the unused pins in the input port and cause disruptions in the operation of the communications device (e.g., computing device, telephone, camera, wireless communications device, etc.). However, due to the detection phase of the standard, permanent termination of these unused pins is not a viable solution since the communications device must provide a pre-determined input impedance (e.g., signature) to the power supply equipment (PSE) of the LAN service provider to properly identify the communications device as standard-compliant before delivering power to the device. Therefore, permanent termination of the unused pins would alter the value of this pre-determined impedance and thus prevent injection of the necessary power to commence device operation.

Therefore, due to the problems arising from spurious emissions radiating from unused pins in a communications interface of a communications device that may not be solved by permanent termination, there is a need to provide dynamic termination of these unused pins while still allowing (regular) power delivery, via the interface, to the communications device to maintain (normal) operation of the communications device.

SUMMARY OF THE INVENTION

The system and method of the present invention overcomes the previously mentioned problems by providing dynamic termination of unused wired connections in a communications interface of a communications device. An interconnected controller, switch, and termination circuit are provided to connect at least one unused wired connection of the communications interface to ground in response to a pre-determined event. Advantageously, embodiments of the present invention described herein may be used to dynamically terminate one or more unused wired connections of the communications interface while still allowing (regular) power delivery, via the interface, to the communications device to maintain (commence) operation of the communications device.

BRIEF DESCRIPTION OF THE DRAWINGS

FIG. 2 is a table showing the pin designations for an exemplary communications interface allowing power delivery found in the background art.

FIG. 3 is a block diagram showing the parameter requirements for an exemplary input section to a communications device allowing delivery found in the background art.

DETAILED DESCRIPTION

Figure 1:
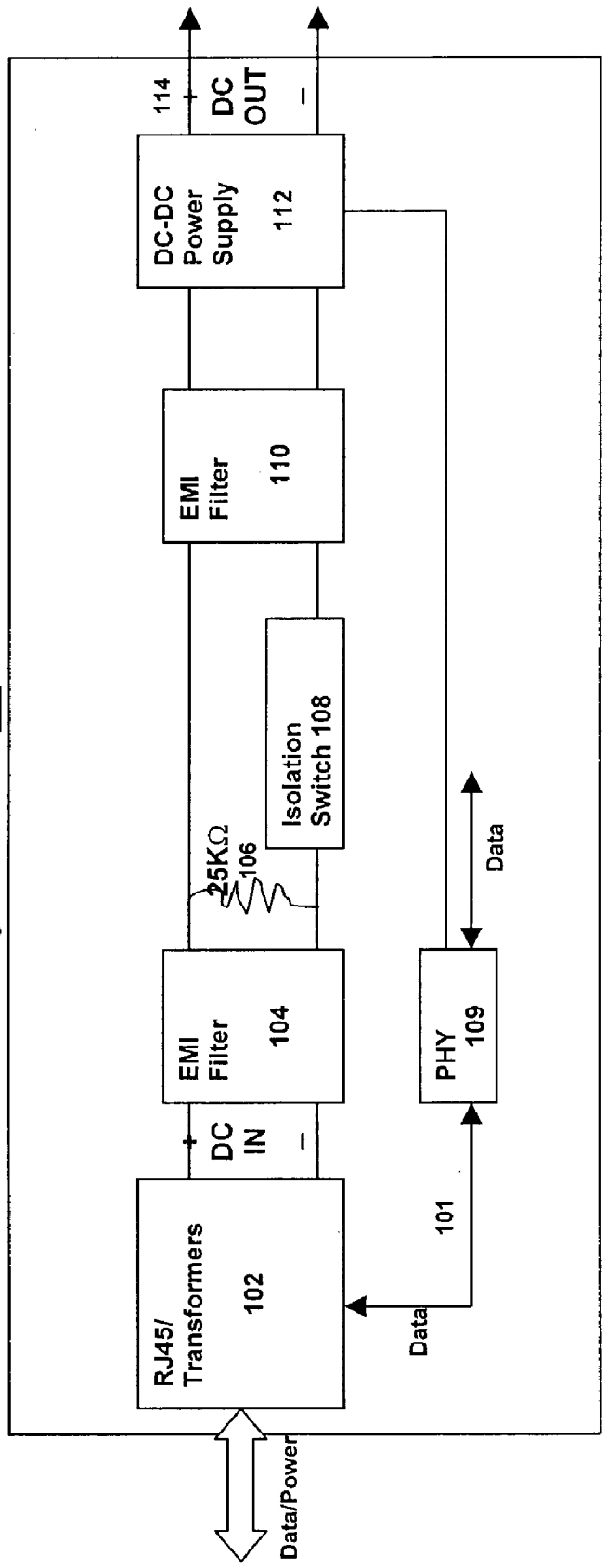
FIG. 1 is a block diagram of an exemplary input section to a communications device allowing power delivery found in the background art.

FIG. 1 shows a block diagram of an input section 100 to a communications device (not shown) allowing power delivery (injection) in accordance with the background art. Input section 100 includes input port 102, electromagnetic (EMI) filters 104, 110, resistor 106, isolation switch 108, transceiver physical device (PHY) 109, and DC-DC power supply 112. Input port 102 may include RJ-45 (registered jack-45) and transformer portions. Isolation switch 108 and resistor 106 assist in a detection mode, as described in greater detail later, for the circuitry of the input section 100. DC-DC power supply 112 acts as the power supply for the communications device and should reflect the power requirements of IEEE 802.3af specification which include, but are not limited to, less than 12.95 Watt power consumption, input-to-output isolation of 1500 Vrms, and other parameters.

The input port 102 may function as a communications interface providing a standard data/power connection for local area network (e.g., Ethernet) devices allowing a LAN service provider to communicate data and deliver power, preferably via category-5 (CAT-5) cabling, with the communications device that is LAN-compatible. PHY 109 acts as a transceiver for data communications to and from input port 102 via data lines 101 and receives power from supply 112. Although not shown, other transceiver PHYs may be used as transceivers for other communications interfaces (e.g., PCM- CIA—Personal Computer Memory Card Industry Association interface) on the communications device and receive power from interconnected power supply 112.

As shown in FIG. 2, the input port 102 includes eight wired pins (connections) for communicating with the LAN cable link and communicating information to and from the communications device in accordance with the IEEE 802.3af specification. These eight pins may include data pins 1-3, and 6 that may be used to transfer data and deliver power to the communications device leaving the other pins unused (e.g., pins 4-5, 7-8). Additionally, input port 102 may include receiving/transmitting transformers to help transport/convert power received from the LAN service provider to the power supply 112 of the communications device. Preferably, these transformers are in accordance with the IEEE 802.3af specification and are able to handle 450 mA and 350 mA as peak and average current values, respectively. Advantageously, a connected communications device may include, but is not limited, to any LAN-compatible device including telephones, computing devices, cameras, wireless communications devices, and other LAN-compatible devices.

EMI filter 104 may protect the circuitry of the input section 100 from external surges and spikes produced from ESD (electrostatic discharge) or other testing, and also filter emissions generated by the input section circuitry. EMI filter 110 may isolate the link side (with RJ-45 interface) of the circuit from the DC-DC power supply 112 when isolation switch 108 initiates the detection (signature mode) for the circuitry.

In accordance with IEEE 802.3af, prior to power delivery, the LAN service provider may initiate a signature (detection) mode to discern whether its power supply equipment is connected to an open link, a compatible power-over-LAN device, or an incompatible power-over-LAN device. If the service provider identifies anything other than a compatible power-over-LAN device, then no power injection will occur. As shown in FIG. 3, acceptable circuit parameters of the input section 100 for proper signature detection are shown in accordance with 802.3af specification.

Figure 4:
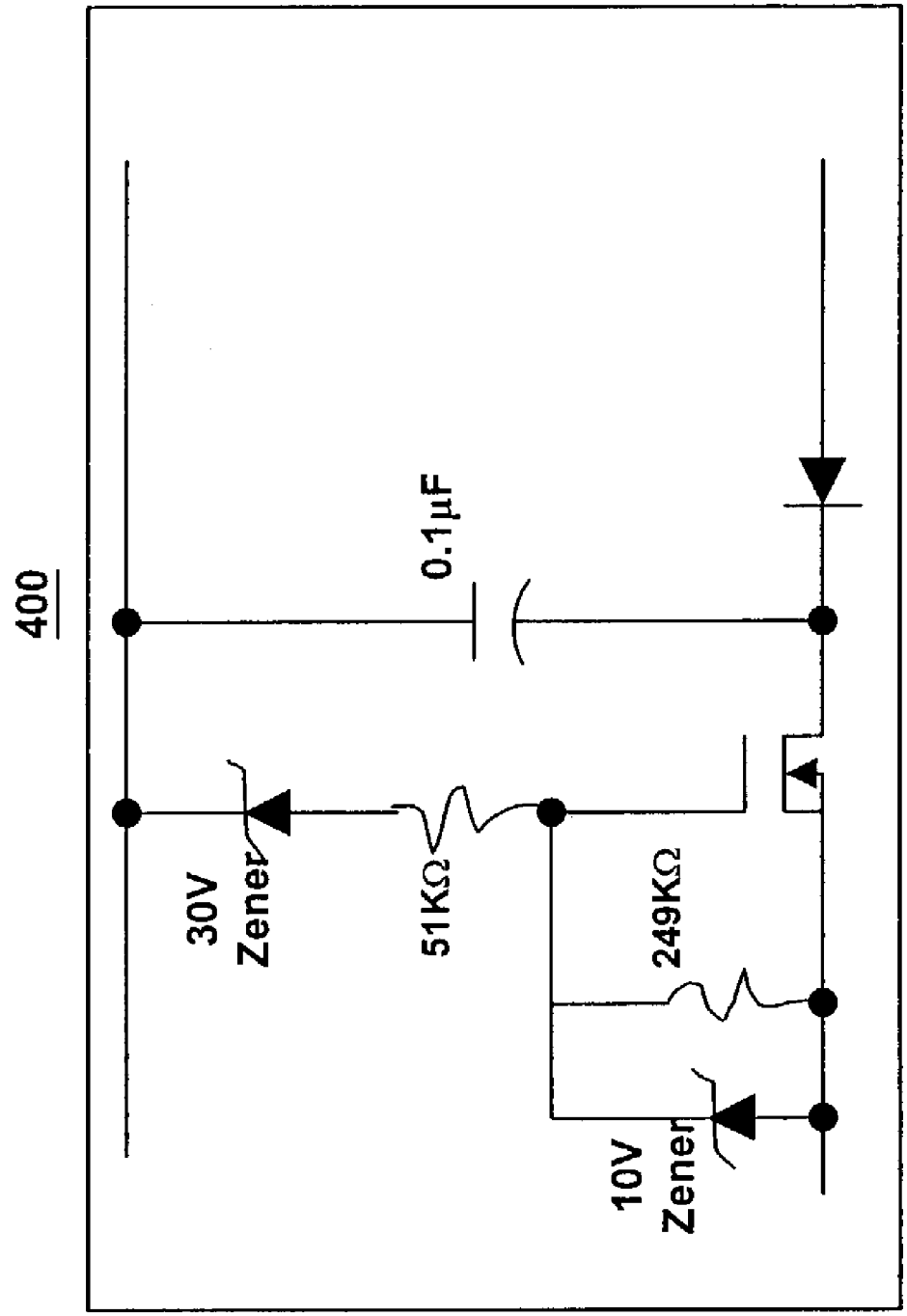
FIG. 4 is a block diagram of an exemplary isolation switch found in the background art.

As shown in FIG. 1, the key detection mode elements are the resistor 106 (a 25 KΩ resistor) and the isolation switch 108. During detection (signature) mode, a low voltage (e.g., much less than 30 volts) is transmitted into input section 100 and a pre-determined input impedance, created by the 25 KΩ resistor 106, is detected by the service provider. Upon detection of this impedance signature, voltage upon the input line increases to at least 30V, the turn-on voltage for the communications device. When switch 108 detects a voltage of at least 30V and less than 36V (e.g., the turn-off voltage for the communications device), the switch 108 activates to connect the link (cable) side with the DC-DC power supply 112 to produce the necessary power for device operation that is output on line 114 for delivery to various portions (e.g., processor, display, hard-drive, CD-ROM drive, etc.) of the device. As shown in FIG. 4, isolation switch 108 may be a mosfet circuit 400 biased to "turn-on" at 30 volts to complete the link connection to the DC-DC power supply 112.

Figure 5:
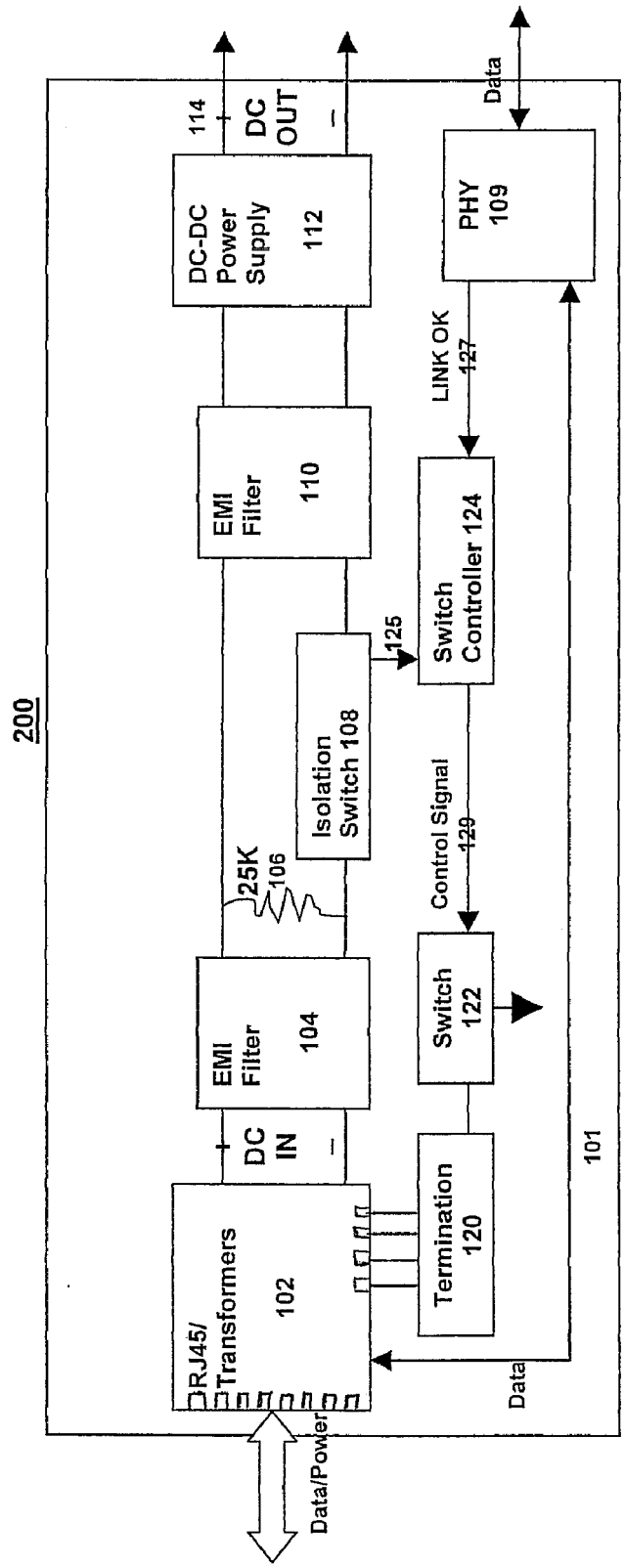
FIG. 5 is a block diagram of an exemplary input section to a communications device providing dynamic termination in accordance with an embodiment of the present invention.
Figure 6:
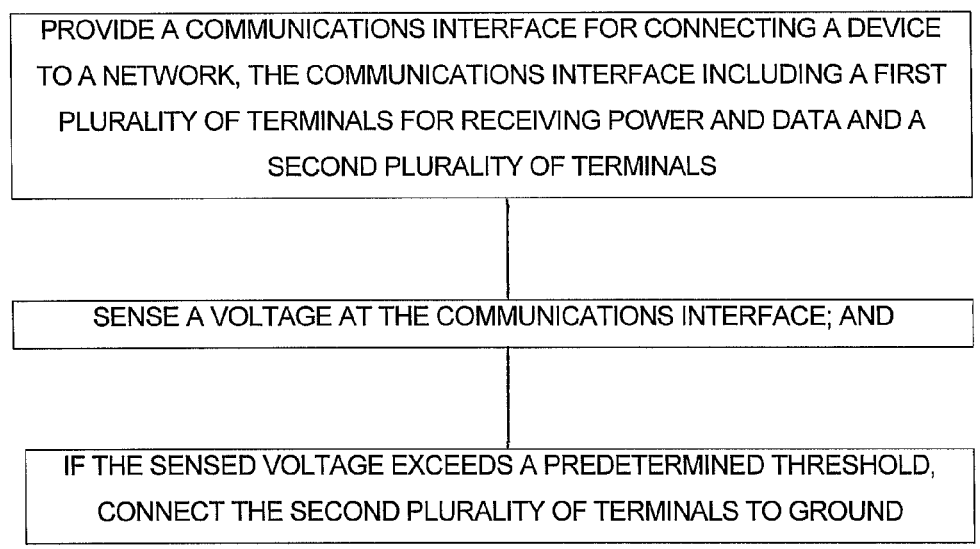
FIG. 6 is a flow chart illustrating a method according to an embodiment of the present invention.

FIG. 5 is a block diagram of an exemplary input section 200 to a communications device providing dynamic termination in accordance with an embodiment of the present invention. Elements of input section 200 common to input section 100 have been included in FIG. 5. New elements of input section 200 include interconnected switch controller 124, switch 122, and termination circuit 120. Advantageously, switch controller 124 may receive power from power supply 112 and switch 122 may be embodied as a relay circuit to withstand 1500 $V_{rms}$. Although shown as separate elements, it is noted that termination circuit 120 and switch 122 may be co-located and their configuration in FIG. 5 is solely exemplary and should not be viewed as a limitation upon the present invention.

Advantageously, switch 122 connects to ground and termination circuit 120 connects to the unused pins of communications interface (RJ-45) 102 (e.g., pins 4-5, 7-8). Termination circuit 120 may be embodied as an RC circuit (impedance of R+1/jωC). During the signature mode (before power injection) of operation, switch 122 is open (inactive) making the combination of switch 122 and termination circuit 120 an effective open circuit ((1/jωC)=0) which does not change the expected impedance value (e.g., R=25 KΩ) seen by the LAN service provider during this mode in accordance with the IEEE 802.3af specification.

Once the communications device is properly identified as a LAN-compatible device, the power supply equipment of the service provider may send an input voltage increasing over 30 volts to input port 102. Isolation switch 108 senses the turn-on voltage of 30-36 volts being satisfied, and completes the circuit connection between input port 102 and power supply 112.

Upon closing of the switch 108, switch controller 124 receives a control signal 125, generated by the isolation switch 108, and receives a digital control signal 127 from PHY 109. Control signal 125 may be a digital signal generated using an analog-to-digital (A/D) converter (not shown) to convert an analog trigger (indicating a closed switch 108) from the MOSFET circuit 400 to a digital control signal 125 (high signal with value of "1") for switch controller 124. Digital control signal 127 (Link OK) may be a digital signal, generated by PHY 109 in accordance with IEEE 802.3af specification, that goes "high" (digital value of "1") when the turn-on voltage is reached to commence (normal) operation of the communications device. At switch controller 124, the combination of receiving two "high" input control signals 125, 127 may trigger (e.g., via a logic function—"AND" of the two control inputs) switch controller 124 to send a control signal 129 to switch 122 instructing the switch 122 to close (become active) and complete the connection between unused pins (4-5, 7-8), via termination circuit 120, and ground.

Advantageously, this process may be repeated upon any subsequent power-up of the communications device as both switches 108, 122 effectively open (become inactive) upon power-down of the communications device as the voltage goes below the turn-on voltage of 30 volts to reverse the process and separate the communications link (cable) portion from the power supply 112. Also, switch controller 124 receives a digital low signal (e.g. "0") from both isolation switch 108 and PHY 109 indicating that power-down has occurred which triggers, via the control signal 129 sent to switch 122, removal of the termination to ground for unused pins of the input port 102. Advantageously, grounding the unused pins reduces and/or eliminates spurious emissions that may be produced from coupling of power, EMI, and other noise on to these unused pins from the LAN connection to input port 102. It is noted that unused pins 4-5, 7-8 are solely exemplary and should not be viewed as any limitation upon the present invention.

Although particular structural configurations have been illustrated regarding the component parts of the input section 200 (e.g., the isolation switch 108 in FIG. 4), it should be appreciated that such configurations are merely exemplary. The present invention can employ various component parts having various structural configurations without departing from the scope of the invention as claimed.

Advantageously, in accordance with embodiments of the present invention, the method and system disclosed herein enables the dynamic termination of at least one unused wired connection of a LAN interface port upon sensing of a turn-on voltage to commence power-over-LAN operation of the interconnected communications device.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. An apparatus for dynamic termination, comprising:
a controller;
a switch for receiving a control signal from said controller; and
a termination circuit, interconnected to said switch, and for interconnection to ground and to at least one unused wired connection in a communications interface, wherein said controller, in response to a pre-determined event, sends a control signal to said switch to connect said at least one unused wired connection to ground using the termination circuit, wherein said pre-determined event is a voltage threshold being satisfied by an input voltage to said communications interface.

2. The apparatus of claim 1, wherein said voltage threshold is approximately 30 volts.

3. The apparatus of claim 1, wherein said communications interface is a local area network communications interface.

4. The apparatus of claim 1, wherein said communications interface allows power and data to be delivered to a communications device.

5. The apparatus of claim 1, wherein said communications interface comprises an element of one of a computing device, camera, telephone and wireless communications device.

6. The apparatus of claim 1, wherein said control signal is a digital signal.

7. The apparatus of claim 1, wherein said at least one unused wired connection is an unused pin in said communications interface.

8. A method for terminating unused terminals of a communication interface, the method comprising the steps of:
providing a communications interface for connecting a device to a network;
sensing if a voltage is transmitted from the network to the device through the communications interlace; and
if so, activating a switch to selectively connect at least one unused terminal of the communications interface to ground.

9. The method according to claim 8, wherein said step of sensing includes:
comparing a voltage transmitted through the communication interface to a first predetermined threshold.

10. The method according to claim 9, wherein the first predetermined threshold is approximately 30 volts.

11. The method according to claim 9, further comprising the steps of:
comparing the voltage transmitted through the communication interface to a second predetermined threshold; and
if the voltage exceeds the second predetermined threshold, disconnecting the at least one unused terminal of the communication interface from ground.

12. The method according to claim 11, wherein the second predetermined threshold is approximately 36 volts.

13. The method according to claim 10, further comprising the steps of:
comparing the voltage transmitted through the communication interface to a second predetermined threshold; and
if the voltage exceeds the second predetermined threshold, disconnecting the at least one unused terminal of the communication interface from ground.

14. The method according to claim 13, wherein the second predetermined threshold is approximately 36 volts.

15. A communications interface for connecting a device having a power supply to a network, the communications interface comprising:
an input port having a first plurality of connectors for receiving power and data and a second plurality of connectors;
a first switch for connecting the first plurality of connectors to the power supply; and
a controller for connecting the second plurality of connectors to ground after power is received at the first plurality of connectors.

16. The communications interface of claim 15 including a second switch, wherein the controller controls the second switch to connect the second plurality of connectors to ground in response to power being received at the first plurality of connectors.

17. The communications interface of claim 15 wherein the controller connects the second plurality of connectors to ground in response to the first switch connecting the first plurality of connectors to the power supply.

18. The communications interface of claim 15 wherein the controller connects the second plurality of connectors to ground when the power at the input port rises from a first level to a second level.

19. The communications interface of claim 15 wherein said controller connects the second plurality of connectors to ground in response to the receipt of both a first signal and a second signal, the first signal indicating that the first plurality of connectors is connected to the power supply and the second signal indicating that an additional condition has occurred.

20. The communications interface of claim 15 wherein said second plurality of connectors comprise connectors not used by the device.

21. A method for terminating unused terminals of a communication interface, the method comprising:
providing a communications interface for connecting a device to a network, the communications interface including a first plurality of terminals for receiving power and data and a second plurality of terminals;
sensing a voltage at the communications interface; and
if the sensed voltage exceeds a predetermined threshold, connecting the second plurality of terminals to ground.

22. The method of claim 19 wherein the first plurality of terminals is connected to a power supply of the device and including connecting the first plurality of terminals to the power supply when the sensed voltage exceeds the predetermined threshold.

* * * * *